United States Patent
Michel (10) Patent No.: US 6,523,779 B1
(45) Date of Patent: Feb. 25, 2003

(54) MOBILE PARTITION DEVICE FOR SEPARATING CLASSES IN A PASSENGER COMPARTMENT SUCH AS IN AN AIRLINER

(75) Inventor: Dominique Michel, La Varenne (FR)

(73) Assignee: Adder S.A., Le Plessis Trevise (FR)

( * ) Notice: Subject to any disclaimer, the term of this patent is extended or adjusted under 35 U.S.C. 154(b) by 0 days.

(21) Appl. No.: 09/700,489
(22) PCT Filed: Mar. 13, 2000
(86) PCT No.: PCT/FR00/00601
§ 371 (c)(1), (2), (4) Date: Apr. 13, 2001
(87) PCT Pub. No.: WO00/56601
PCT Pub. Date: Sep. 28, 2000

(30) Foreign Application Priority Data

Mar. 19, 1999 (FR) .............................. 99 03452

(51) Int. Cl.$^7$ .............................. B64D 11/06
(52) U.S. Cl. .................. 244/118.5; 49/380; 49/463; 49/404; 52/64
(58) Field of Search .......................... 244/118.5, 118.6, 244/118.1; 49/139, 324, 380, 381, 463, 404, 411, 413; 52/64

(56) References Cited

U.S. PATENT DOCUMENTS 5,804,931 A * 9/1998 Schack ........................ 318/4
6,082,053 A * 7/2000 Bischof et al. ................ 52/64
6,286,258 B1 * 9/2001 Bischof et al. ............... 49/127

FOREIGN PATENT DOCUMENTS

| DE | 4119623 | 10/1992 |
|---|---|---|
| EP | 0754621 | 1/1997 |
| WO | WO 9938771 | 8/1999 |

* cited by examiner

Primary Examiner—J. Woodrow Eldred
(74) Attorney, Agent, or Firm—Lowe Hauptman Gilman & Berner, LLP

(57) ABSTRACT

The movable class-partitioning divider for an illustrative airliner passenger cabin comprises in particular: a device to lock said divider into a mooring adapter selected during the translation of the divider along a guide rail configured longitudinally in said cabin and unlocking it before such translation takes place; a device connecting at least one first connector, which is firmly affixed to a movable support mounted on a longitudinal rail solidly joined to the cabin, to a second connector solidly which is firmly affixed to said mooring adapter; a device operating said locking and connecting devices during translational operation; a device to preclude actuating said operating devices as long as at least the first connector is outside a given connection zone to said second connector firmly affixed to said mooring adapter. Application: passenger transportation.

17 Claims, 8 Drawing Sheets

MOBILE PARTITION DEVICE FOR SEPARATING CLASSES IN A PASSENGER COMPARTMENT SUCH AS IN AN AIRLINER

The present invention relates to a movable class-divider for use in an airliner with a central aisle.

Movable partitions/dividers are known in the state of the art, and, when fitted with a curtain or wall, allow dividing an airliner's passenger cabin, or any other enclosed space, into two classes, in the manner of the so-called first and second class zones.

In general such a divider comprises a beam fitted with hook means, a curtain or a wall and fittings allowing to move said partition along one or more rails constraining the beam motion carried out on rollers. Typically said beam is designed to follow the ceiling cross-section of said cabin at the anticipated site of displacement.

According to cabin management requirements, the servicing personnel is able to partition the cabin zones by means of said dividers which then must be locked into their new positions.

Another problem encountered in this field and in particular relating to air transportation is the requirement to display on said dividers in particular a number of visual safety signals that shall not be masked in conformity with aircraft regulations.

However, to heed such regulations, said signal displays impose two features on the dividers:

(1) a class divider must be electrically connected to the communication bus of the safety signals and furthermore must comprise corresponding signal receivers so that, once the class divider has been put in place, safety signal display shall be assured, (2) as regards a movable divider, when it is moved along the path implemented by the rails or slides as it configures the passenger cabin into distinct classes, the above-mentioned crossbeam may not be hampered or stopped by the conventional signaling elements mounted in the cabin regardless of the dividers.

Whether the divider be stationary or displaceable, the signaling problem is encountered in the same manner also by other additional devices when posters, various screen displays and the like are in the path of the movable divider.

Proposals to overcome these difficulties already have been advanced to the effect to make the components of the crossbeam individually detachable and movable, however such; a solution is unsatisfactory.

Illustratively systems have been suggested wherein the central crossbeam component hinges in the manner of two-part scissors, said parts being lowered while detaching from mooring adapters situated at predetermined intervals along the potential path of the divider. In this manner the divider can be pushed along its guide rails and be mechanically and electrically reconnected to new mooring adapters by closing the scissors.

In another design described in particular in the French patent application 98-00892 filed by the applicant, the divider consists of two arms which shall be mutually linked, at least during divider repositioning, to a central support element mounted by hinges or slides on the guide rails, where said hinges or slides are controlled in such a way that the side arms shall move relatively to the central support element.

However, in all cases, the divider must be:

extremely well locked on its mooring adapters in order to stay in position during all aircraft maneuvers on the ground or in flight, connected electrically extremely well to the aircraft's communications/signaling bus.

But, in these devices of the state of the art, either the connection is implemented manually, that is by the operator who moved the class divider reconnecting two connectors to their respective cable ends, or a connecting mechanism is provided which, if it would be moved outside an appropriate connection position might damage the divider's components or the passenger cabin itself.

The present invention offers palliation to these diverse technical scenarios by offering a movable class divider which is situated for instance in an airliner passenger cabin and which comprises:

a device to lock the divider within a mooring adapter when said divider is moving along a guide rail running longitudinally within said cabin and to unlock said divider before such translation takes place, a device to connect at least a first signaling connector firmly affixed to a displaceable support associated with the translationally displaceable divider to a second signaling connector of said mooring adapter, a device to operate said locking and connecting devices during translational handling, a device interlocking said operating device as long as at least said first connector means outside a given connecting position relative to said second connector firmly affixed to the mooring adapter.

In one feature of the invention, the divider comprises at least one roller-fitted carriage of which at least one roller or wheel shall engage a rail firmly affixed to the passenger cabin and situated along the divider's divider repositioning path.

In another feature of the invention, at least one roller-fitted carriage is mounted in stationary manner on a segment of the divider's framework.

In another feature of the invention, the device locking the divider into a mooring adapter comprises at least an inner bush constantly biased by a return spring toward the mooring adapter and being driven, in particular by an operating handle, between at least one unlocked position (A) and one locked position (C).

In another feature of the invention, the device connecting at least a first signaling connector to a second connector solidly joined to said mooring adapter comprises an external bush bearing at its upper end a connector support displaceable inside an aperture of the inner bush, said external bush being driven in particular by an operating handle between at least a disconnected position (B) and an appropriate connected position (C).

In another feature of the invention, the devices with which to drive said locking and connection means during translation comprises a cam rigidly joined to a displaceable shaft driven by said operating handle, the end of the external bush opposite the end bearing the connector support being associated with a cam follower, the end of the inner bush which is opposite the end that shall make contact with the mooring adapter selected along the divider repositioning path being associated with a second cam follower.

In another feature of the invention, the device precluding driving the operating devices as long as at least said first connector is not situated in a given connecting position relative to said second connector firmly joined to said mooring adapter comprises an appropriate position detector associated with said mooring adapter selected along the divider repositioning path.

In another feature of the invention, said appropriate position detector comprises a stub projecting from the end of the inner bush and designed to make contact with the mooring adapter selected along the divider repositioning path cooperating with the predetermined cross-section of a channel in the side opposite said mooring adapter, whereby said stub shall be flush only when the end opposite the inner bush is situated in a locking seat of said mooring adapter.

In another feature of the invention, the stub is biased out of the inner stub by a spring mounted between the end of said inner bush and the end opposite the stub, its course thereby being limited within the external bush by a pin which is displaceable into at least one aperture of said external bush.

In another feature of the invention, the inner bush is fitted with a borehole inside of which is situated a pair of half-shells that shall assume two positions:

one position to firmly affix the external bush to the support when the stub is not depressed following detection of an appropriate connection position, whereby the shaft and/or the cam cannot be driven, a second position to disengage the external bush from the support when the stub is depressed following detection of an appropriate connecting position, whereby the shaft and/or the cam can be driven.

In another feature of the invention, the stub is integral with a narrow zone fitted with two constrictions each receiving a pair of high and low balls that are housed in the inside surface of the half-shells, whereby—with the stub depressed to be flush with the inner bush end during the detection of the appropriate position—the two pairs of balls shall be situated in the constrictions of the stub's narrow zone;

and in that the external bush comprises two seats for one pair of balls, said balls being flush between the external wall of the half-shells when the inner and external bushes are affixed to each other and are forced inward when the two bushes are disengaged.

In another feature of the invention, two yokes are mounted opposite the pair of balls resting on the external bush and are shaped in such a way that:

the balls shall be forced inward to rest against the half-shells when the external bush and the support are disengaged, the balls shall be retracted inside the yokes when the external bush and the support are affixed to each other.

In another feature of the invention, the yokes are affixed by pins to covers fastened to the body of the roller-fitted carriage in order to allow access to the device precluding driving said operating devices.

In another feature of the invention, the movable divider comprises:

a central segment which is designed to move along the aisle ceiling and which bears at least one roller-fitted carriage engaging a longitudinal rail, a plurality of mooring adapters allowing connecting the signaling connectors and/or locking the divider, a pair of side arms each situated on its side of the central segment with which it is integral and each designed to move along the ceiling of an aisle bordering said line of seats, and/or at least one side arm affixed to the ceiling above one row of seats and bordering one of said lateral aisles.

Other features of the invention are elucidated below in relation to the following description and the attached drawings.

Figure 1:
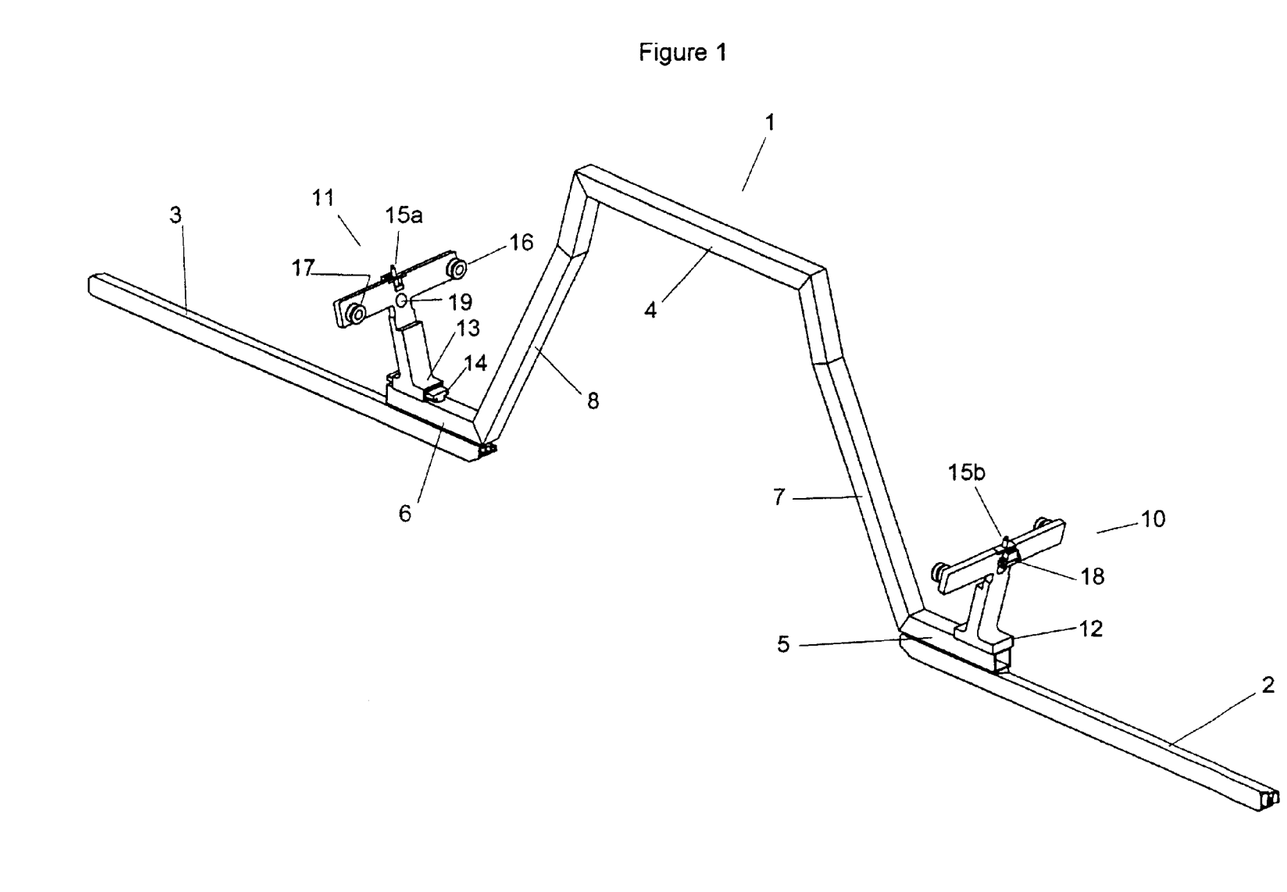
FIG. 1 is a perspective of the framework of a divider of a preferred embodiment of the invention and shown without its equipment and as yet uninstalled in the passenger cabin.

FIG. 1 is a perspective of the framework of a divider of a preferred embodiment of the invention, without its equipment and as yet not installed in the passenger cabin. The framework mainly consists of several cross-sectionally contoured bars made of aluminum or another metal and substantially straight and connected in known manner to one another. The framework comprises a central segment 1 made of a square, welded-steel pipe, further a right side arm 2 and a left side arm 3.

The central segment is 1 shaped so that it shall be situated near the ceiling of the central aisle of an airliner's passenger cabin. The central segment I comprises a cross-sectionally shaped central bar 4 onto which are affixed to a right part 7 and a left part 8 shaped to allow divider repositioning between the luggage racks that in this kind of passenger cabin are situated above the lateral chairs on both sides of the central aisle.

The right and left parts 7 and 8 resp. are attached to the right side arm 2 and to the left side arm 3 by two cross-sectionally shaped bars 5 and 6 in a manner to constitute an integral, i.e. a one-piece assembly. Be it noted that this configuration of three indispensable components of the framework of the class divider of the invention substantially simplifies the design of such a divider relative to the dividers of the state of the art.

The central segment 1 comprises a horizontal right and left beam 5 and 6 resp. each bearing a right and a left roller-fitted carriage 10 and 11. In the preferred embodiment mode, the right roller-fitted carriage 10 is solidly joined by its base 12 to the right horizontal beam 5 whereas the left roller-fitted carriage 11 is mounted by its base 13 on a slide 14 running in substantially elongated form in the direction perpendicular to the guide rail (omitted from FIG. 1). The structure of the roller-fitted left or right carriages 11 or 10 resp. shall be further elucidated in relation to FIG. 3.

Each right and left roller-fitted carriage 10 and 11 comprises a head 17 and 15 resp. bearing stub which shall be discussed in further detail below. Moreover a first electric connector is firmly affixed to a movable element of the head (this Figure only shows and references the first connector 18 of the head 10 of the roller-fitted right carriage 5). A cover 19 of which the function is explained further below is shown on the roller-fitted left carriage 11. Each roller-fitted right and left carriage head bears two rollers or wheels 16 and 17 engaging a resp. left or right guide rail.

The right and left side arms 2 and 3 resp. are configured during divider repositioning together with their accessories, paneling aid curtains in particular, underneath the ceiling of the baggage racks. During divider repositioning, said arms are always situated within the free space bounded on one hand by the tops of the chairs (omitted from FIG. 1) and by the bottom of the signaling device or any other device projecting underneath the baggage racks and above the space occupied by the chairs, thereby making divider repositioning very easy.

Figure 2:
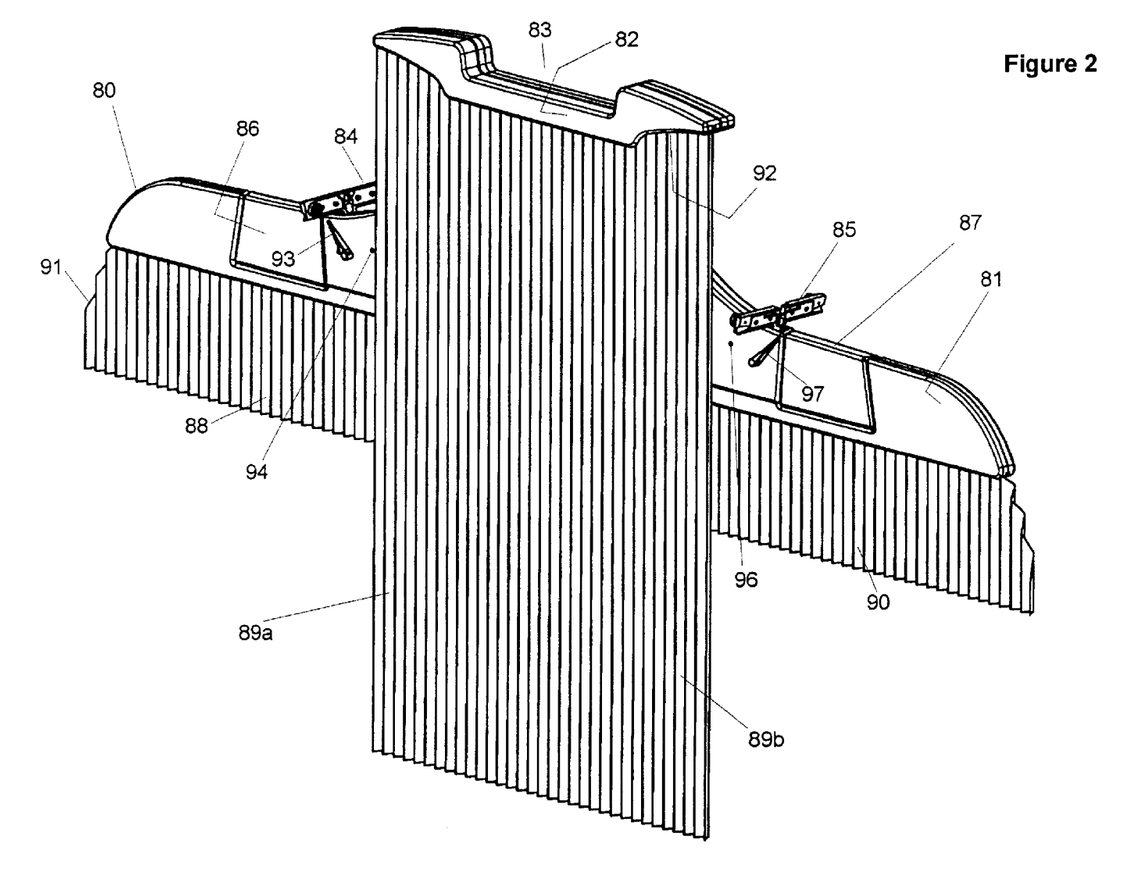
FIG. 2 is a perspective of an embodiment of the movable divider of the invention without accessories such as the rails and the mooring adapters that will be subsequently mounted and then be affixed to the passenger cabin.

FIG. 2 is a perspective of an embodiment of the movable divider of the invention without its assembled accessories such as the rails and the mooring adapters that are firmly affixed to the passenger cabin.

The framework shown in FIG. 1 is enclosed in paneling which comprises paneling segments 80 for the right side arm, 82 for the central connecting segment and 81 for the left side arm. As shown in this embodiment, each paneling segment assumes the form of a shell itself constituted of two half-shells for instance made of a molded material. In one embodiment, the paneling segments of the side arms 80 and 81 each comprise an aperture crossed by the upper end, or head, of the roller-fitted carriage 84 or 85 to allow locking the movable divider onto a selected pair of mooring adapters at the desired new position of the said class divider.

Preferably but not mandatorily, each side arm is fitted with two recesses which are closed by matching covers 86 or 87 and each recess allows passing large panels such as viewing screens affixed to the end of the luggage racks above each row of chairs (omitted).

In another embodiment mode omitted from the drawing, the apertures or recesses of FIG. 2 and masked by the covers 86 or 87 are occupied at least in part by viewing/VDU screens displaying multimedia, safety messages or others. In such a case, together with any other security signaling device mounted on the divider of the invention, the viewing screen is also connected to the first signaling connector resting on the roller-fitted carriage which shall be described further below. In this instance the terminals of the first and second signaling connectors are matched in manner known per se.

The paneling component 82 of the central framework segment comprises an offset 83 to displace said divider when the ceiling of the passenger cabin's ceiling is fitted with safety lights or any other object projecting from this ceiling.

Lastly as regards the embodiment of FIG. 2, three pleated curtains are shown mounted through corresponding apertures in the paneling, namely the right and left curtains 88 and 90 and also those right and left curtains 89a and 89b which descend from the central component 82.

As shown, the paneling segments also are fitted with curtain rods which are masked by these curtains and not visible in the Figure and optionally with drive devices assisting in opening and closing the curtains as well as any disassembly.

In order to conceal the space taken up by the luggage racks, the aisle curtains 89a and 89b are configured in front of the paneling segment of the right or left arm. For that purpose the paneling portion of the central connecting segment 82 comprises a protrusion 92 whereby its vertical side visible in the Figure shall be situated beyond the paneling parts of the side arms 80 and 81.

The passenger cabins of most airliners with a central aisle in particular comprise curved side walls and therefore each outer edge of the side curtain 88 or 90 is fitted with a means allowing to apply it against said side wall by using a flexible rod 91 inserted into a hem of the curtain edge, said rod during the end of the closing motion of said side curtain being forced by an appropriate tipping device to optimally rest against said curved side wall (omitted for clarity. Such a device furthermore is described in the French patent application 98.00892 of the present applicant.

Lastly each carriage is fitted at its right side 84 or left side 85 with an operating handle 93 or 97 resp. and also with a display 94 or 96 showing the locked, unlocked state or the status of the electric connection of each roller-fitted carriage 84 or 85. These handles 93 and 97 are actuated by the operators when the divider of the invention must be moved and then be locked on the pair of mooring adapters in a new position dividing the classes.

Figure 3:
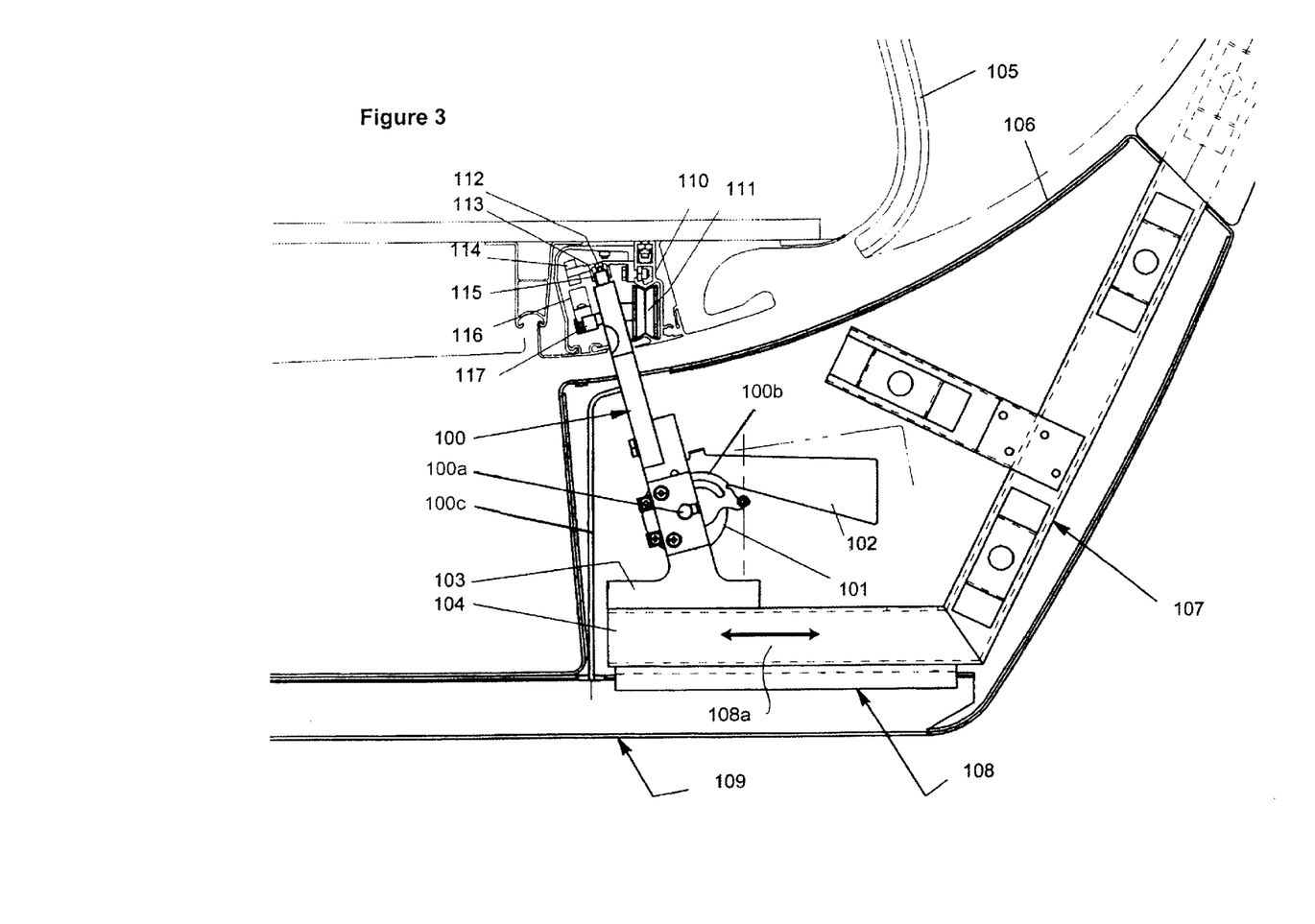
FIG. 3 is a diagrammatic and partly sectional view of a divider of another embodiment of the invention.

FIG. 3 is a partial view of a cross-section of a divider of FIG. 1 with its paneling 106 and two beam segments 107 and 109.

The Figure also partly shows a roller-fitted carriage 100. Said carriage comprises a base 103 which is mounted in displaceable manner along a support 108 that is firmly affixed to the substantially horizontal beam portion 109 constituting one of the side arms of the divider of the invention. Starting at its base 103, the roller-fitted carriage assumes an elongated shape with an axis sloping relative to the vertical substantially at 15° and fitted with a shaft 100a on which is affixed a rotating operating handle, said handle being configured outside the paneling of the divider in a manner not visible in the Figure and being operated by the aircraft's maintenance personnel.

Figure 4:
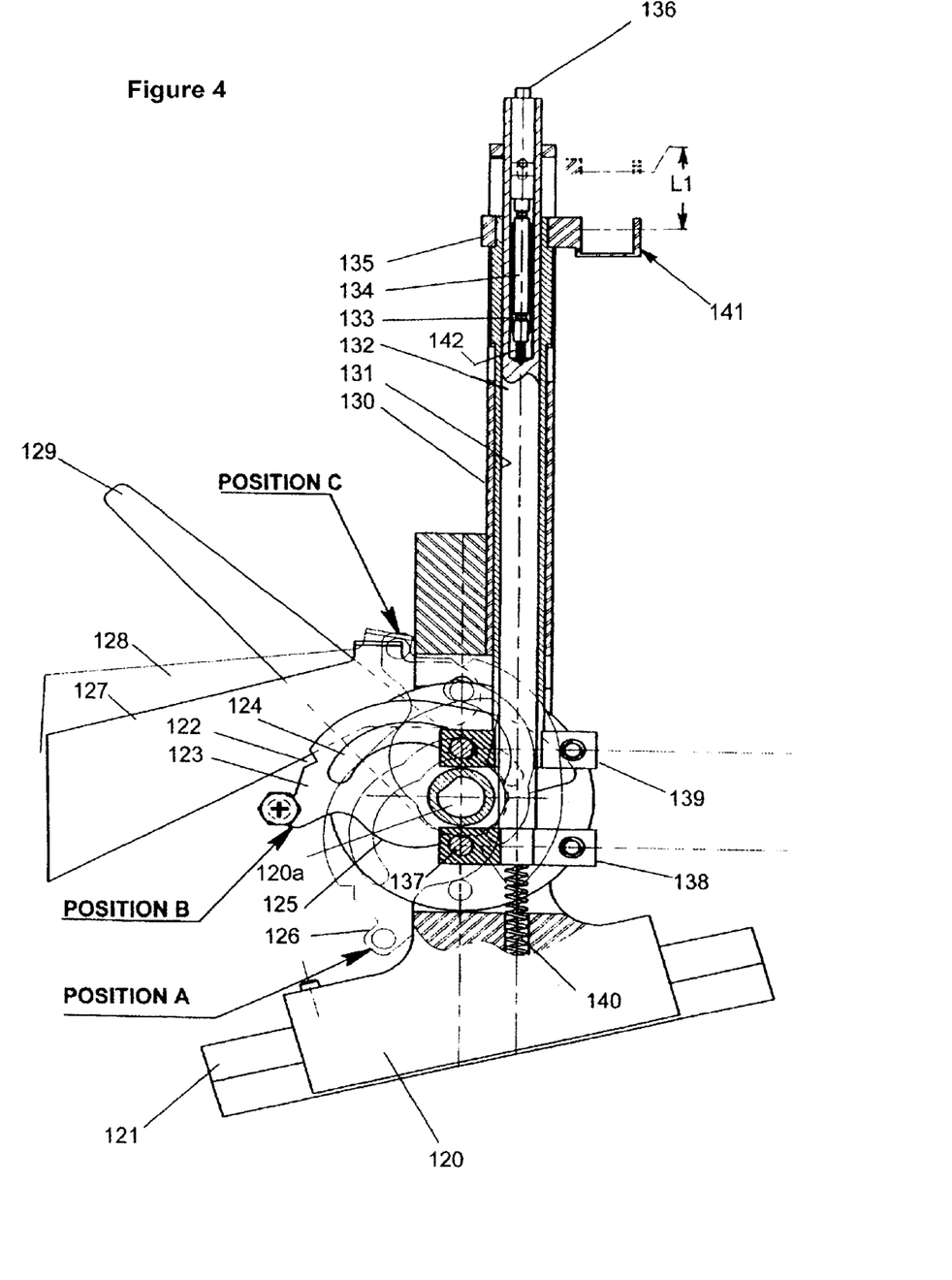
FIG. 4 is another view of the roller-fitted carriage of a preferred embodiment of the invention.

A cam which is shown in greater detail in FIG. 4 is mounted on the shaft and its motion allows tipping a flag 102 which, in front of a window fashioned in the paneling of the divider of the invention, shall constitute a display of the locked or unlocked state of said divider depending on the operation of the (omitted) handle firmly affixed to the shaft 100a.

The roller-fitted carriage 100 exits again through a window in the upper side of the paneling of the class divider and its head enters a seat which is open downward in an assembly constituting the rail 110. The roller 111 engages the inner cross-sectional contour of the rail 110 and is mounted on a shaft in turn firmly affixed to the head of the roller-fitted carriage 100.

A support 117 of a first connector 116 is situated on the other side of the roller-fitted carriage, said first connector being then connected to a second stationary connector 114 which is firmly affixed to the downward-open seat in the assembly constituting the rail 110. In the state shown in FIG. 3, the first connector 116 on its support 117 is in the low position. In order to configure said first connector into a position in which to connect it to the stationary second connector 114 solidly affixed to the passenger cabin, the operator must continue tipping the handle (not shown in FIG. 3) mounted on the shaft 100a: The shaft is mounted on a cam 100b driving a rod of which the head 115 is partly visible in FIG. 3 and which drives the support 117 of the first connector 116.

In a preferred but not exclusionary embodiment mode of the invention, the second connector is firmly joined to a mooring adapter 113 which shall be discussed in further detail below and which is mounted at each predetermined position on the body of the aircraft or on the divider assembly of the invention in as many cases as there shall be locking or mooring positions.

The first connector 116 so fitted with a cable 100c firmly joined to the body of the roller-fitted carriage 110 and crosses the beam portion 109 to reach the signaling devices that shall be fed by the cable and that rest on that side arm associated with the beam portion 109.

Lastly the roller-fitted carriage 100 bears a device 112 blocking driving said operating means as long as at least the first connector 116 shall be outside a given connection position relative to the second connector 114 firmly affixed to said mooring adapter. Preferably the device 112 consists of a detector sensing a given connection position relative to the second connector 114. The detector 112 is designed in relation to the operating handle mounted on the shaft 100a of the roller-fitted carriage 100 in such a way that it shall be impossible to tip the handle toward a locked state as long as the first connector 116 has not reached the predetermined connecting position.

The mooring adapter 113 is firmly affixed to the luggage rack which is seen in partial section in FIG. 3 and of which the door 105 is free to move thanks to the deliberate shape of the beam portion 107 and of the paneling 106 of the class divider of the invention.

FIG. 3 shows the left side of said divider when looking in the direction of aircraft flight. The roller-fitted carriage 100 is mounted in stationary manner, the base being firmly affixed to the beam portion 108. As already explained above in relation to FIG. 1, the other side on the right of divider comprises the same components as those just described except that its roller-fitted carriage is laterally displaceable in the direction of the arrow 108a which is mentioned at this time not in relation to the carriage 100 but in relation to the omitted straight arm. In one embodiment mode, the displacement is limited on a slide firmly joined to the associated beam portion of 20 mm. As a result:

1) during the translation/ moving of the class divider of the invention along two parallel rails such as the rail 110, the adjustment errors of their separation is not within the tolerance of the displacement 108a a blocking factor of the translation along the passenger cabin,
2) when the divider is locked in at least one mooring adapter, the rails on which the divider, when unlocked, is displaceable may deform due to the aircraft's flight mechanics without the roller-fitted carriages being subjected to and transmitting the stresses.

FIG. 4 is a sideview of the roller-fitted carriage, similar to the roller-fitted carriage 100, in its upright position and having left the remainder of the divider of the invention. The base of the roller-fitted carriage which is referenced 120 in this embodiment is shown (partly seen) on its slide 121. The shaft 120a is driven by a handle 129 which, when actuated by the operator, may pivot between three positions: high position C, middle position B and low position A. Rotating the shaft 120a entails rotating a cam 125 which drives two bushes 131 and 132 which, one within the other, constitute the actual body 130 of the roller-fitted carriage (100 of FIG. 3). For that purpose, the external bush 131 comprises a lower end which is firmly affixed to a cam follower 139 of which one stub is inserted in a slot 124 of the above cited cam 125, and the inner bush 132 comprises a lower end solidly affixed to a cam followed 138 of which a stub 137 is constrained to remain in contact with the lower cross-sectional contour of the cam 125. The cam follower 138 and/or inner bush 132 are constantly biased upward into contact with the cross-sectional cam contour 125 by a spring 140 of which a first end is inserted into a seat of the base 120 of the roller-fitted carriage and of which the other end makes contact with the inner bush 132.

The inner bush 132 is hollow and it bears a displaceable train 133 and 134 which is shown in further detail in FIG. 5. This displaceable train is mechanically connected to a stub 136 detecting the mooring position relative to a mooring adapter shown in greater detail in FIGS. 6 through 9.

Inside an aperture of the body 130 the external bush 131 drives the connector support upward during connection and downward during disconnection. The connection of the first and second connectors (both omitted) already described in relation to FIG. 3 therefore is implemented by moving the handle 129 from the position B to the position C and the disconnection is implemented by moving from the position C to the position B. However and according to an essential feature of the invention, moving from the position B to the position C is allowed only if the stub (detector) 136 senses being in an appropriate connecting position.

As elucidated below in relation to FIGS. 7 through 9, the stub 136 is designed to make contact with the bottom of a channel in the mooring adapter along a direction parallel to the displacement, or translation or motion of the divider. Thereupon the stub 136 shall be in the retracted position inside this channel and is flush or nearly so with the upper end of the inner bush 132 from which it projects. As a result the stub 136 blocks the rising motion of the external bush 131 bearing the connector support 141 by using a device which shall be discussed in relation to FIGS. 6 through 11.

Consequently the (omitted) first connector resting on the connector support 141 cannot be moved outside the appropriate connecting position opposite the (omitted) second connector.

Once the stub has terminated its advance along the channel in the mooring adapter while being repelled by the spring 142 installed in the seat of the inner bush 132, said stub releases the blocking device which prevents the external bush 131 to rise relative to the inner bush, and the connector support 141 moves by a height Li to connect the first and second connectors (both omitted from FIG. 4).

Figure 5A:
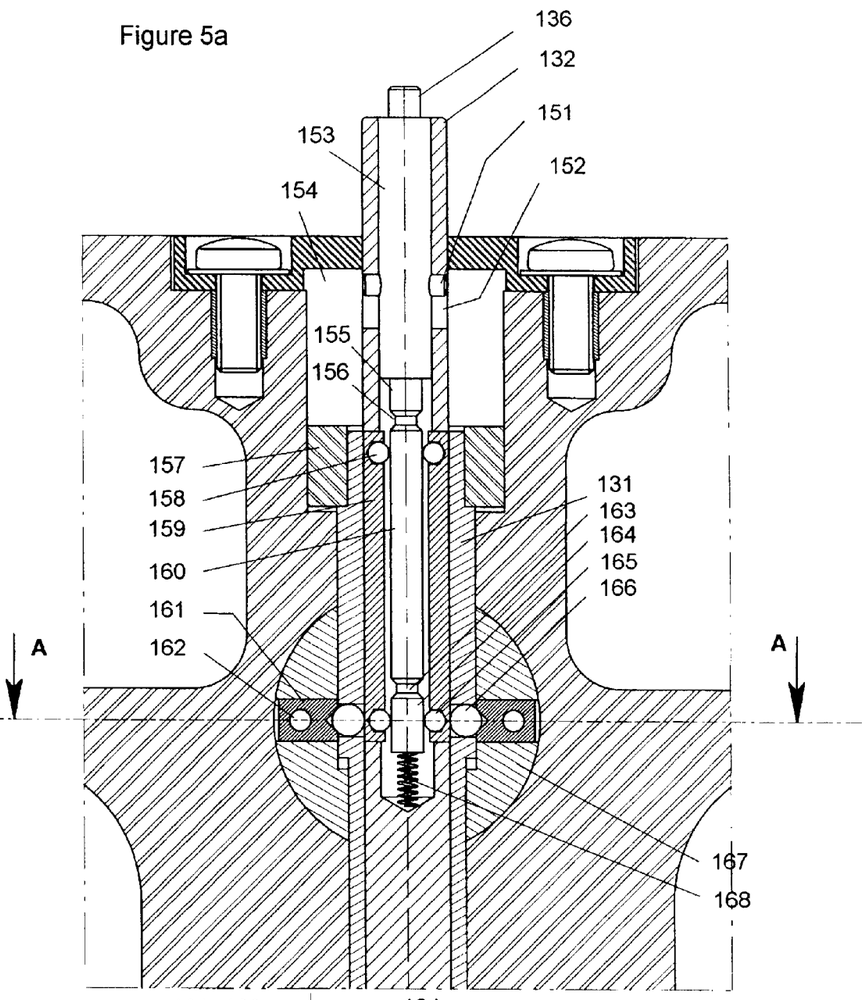
FIGS. 5a, 5b are two sectional, diagrammatic views of the upper part of the roller-fitted carriage of FIG. 4, FIGS. 6–8 are three views of an embodiment of a mooring adapter of the invention.
Figure 5B:
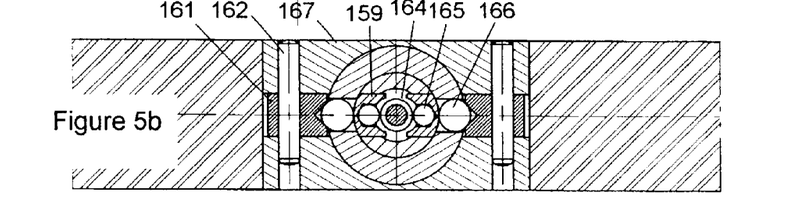

FIGS. 5a and 5b are detailed views of the upper portion of the roller-fitted carriage of the preferred embodiment of FIG. 4. The same components are denoted by the same numerals as in FIG. 4. The stub 136 slides within the cavity of the inner bush 132. The stub 136 actually comprises several coaxial segments, namely:

the actual stub 136 designed to have moved outside the end of the inner bush 132 as long as the roller-fitted carriage is not situated in an appropriate position in its mooring adapter for electric connection, a segment designed to slide inside the inner bush 132 and bearing a cross-pin 151 to limit the excursion of the stub 136 between a low end position when the appropriate connecting position is being detected and a high end position when the carriage is outside said appropriate position, the excursion of the pin 151 and hence of the stub 136 being limited by two apertures such as 152 which are symmetrically configured on the body of the inner bush 132, a segment 155, 156, 163 and 164 entering the inside of the inner bush 132 and comprising two constricted subsegments 156 and 163 elucidated further below and a hollow lower end within which is affixed a spring 167 having a low end supported on the bottom of the inner bush 131 and configured in such manner that, absent a detection of appropriate connecting position, the stub 136 shall effectively project beyond the end of the inner bush 132.

The inner bush 132 and the stub 136 emerge from the top of the roller-fitted carriage which is closed by an unreferenced plate linked to said body by two screws (unreferenced in FIG. 5a), said plate subtending a chamber which is open outside the plane of FIG. 5a and wherein, driven by the handle 129 (FIG. 4), the external bush 131 holding the connector support 157 (referenced as 135, 141 in FIG. 4 and referenced as 18 in FIG. 1) may move.

Two cylindrical half-shells such as 159 are contained inside the upper portion of the inner bush 132, the inside surfaces of said half-shells being situated opposite the narrow segment 155, 156, 160, 163 and 164 of the stub 136. Seen in section along AA in FIG. 5b, the two half-shells 159 are kept spaced away from the periphery of said constricted segment by two pairs of one high ball 158 and one low ball 165, the latter also being shown in the section AA of FIG. 5*b*. The two half-shells 159 are configured in two apertures of the upper hollow portion of the inner bush 132. As regards the state of the connecting-position detector shown in FIGS. 5*a* and 5*b*, the two half-shells 159 are forced against the inside of the upper hollow portion of the external bush 131, and as a result the external bush 131 remains firmly affixed to the roller-fitted carriage.

Each yoke such as the yoke 161 comprising a hollow on its surface making contact with the ball 166 is fitted with a contour making it possible, when the external bush 131 rises from the position shown in FIG. 5*a* to repel the pair of balls 166 inward and thereby the half-shells 159 also are repelled inward.

Figure 6:
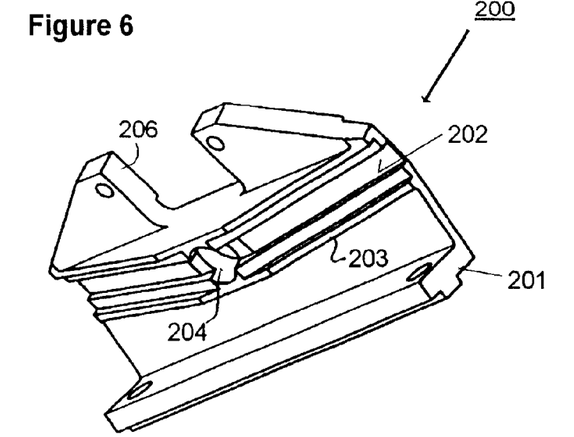
Figure 7:
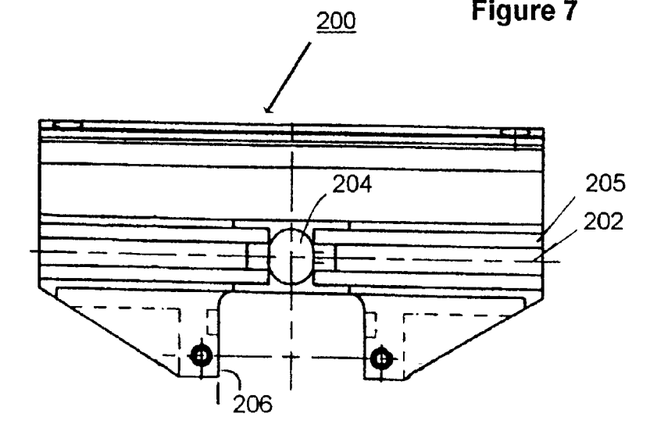
Figure 8:
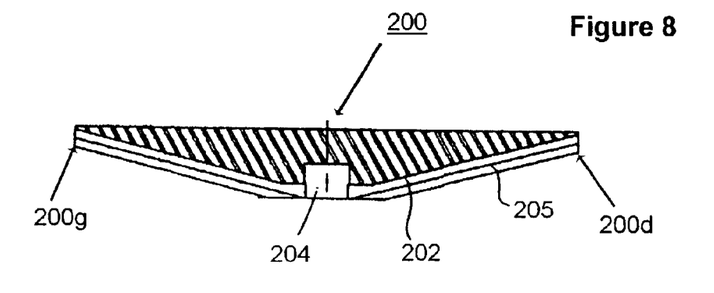

FIGS. 6 through 8 are three views of a preferred embodiment of a mooring adapter and said three Figures are described simultaneously below. The adapter 200 comprises a leg 201 to affix it in an appropriate mooring position inside the hollow seat comprising a rail or slide shown in FIG. 3.

The adapter comprises a seat 206 to allow affixing a second connector (omitted) which shall receive and connect to the first connector which is firmly joined to the (omitted) roller-fitted carriage.

The body of the adapter 200 comprises a channel of which the bottom 202 shall receive the end of the stub 136 (FIG. 3,4) by its right or left part 200*d* or 200*g* resp., the stub 136 being in its extended position beyond the upper end of inner bush 132. The bottom of the channel 202 is fitted at its edges with a shoulder 205 on which comes the upper end of the lower bush.

The mooring adapter is situated at each foreseeable mooring position of a class divider, and as a result the channel 200*g*–200*d* runs longitudinally in the direction of divider translation. As shown in section in FIG. 8, the channel edges constitute a double slope to implement retraction of the inner bush and of the detector stub of each roller-fitted carriage in the manner elucidated further below. The double slope allows mooring equally well from the left and from the right.

Once the divider has been moved sufficiently, the upper end of the inner bush 132 enters the seat 204 and the stub 136 then is pushed by the bottom of the seat 204 to be flush with the upper edge of the inner bush 132. In the manner shown in relation to FIGS. 5*a* and 5*b*, the stub 136 then releases the first pair of half-shells 159 (FIG. 5*a*), allowing the handle 129 (FIG. 4) to rise into position C and hence implementing the connection between the first and second connectors. The rise of the first connector on its support firmly joined to the external bush therefore shall be feasible only when the stub engages the seat 204. In this position, the class divider of the invention shall be appropriately locked into position.

Figure 9:
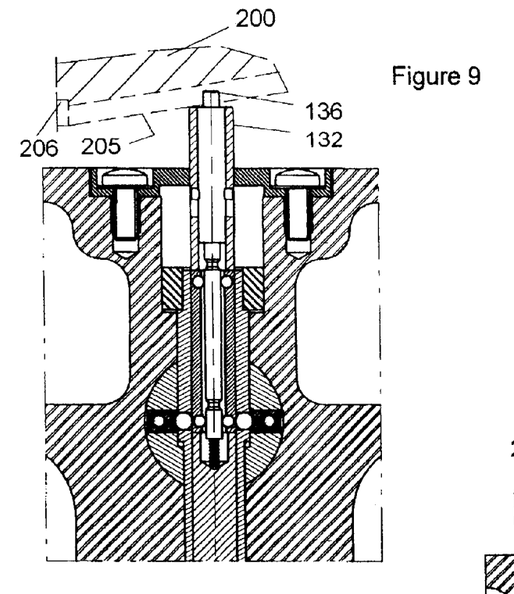
FIGS. 9–11 show three states of the upper part of the roller-fitted carriage shown in detail in FIG. 5.
Figure 10:
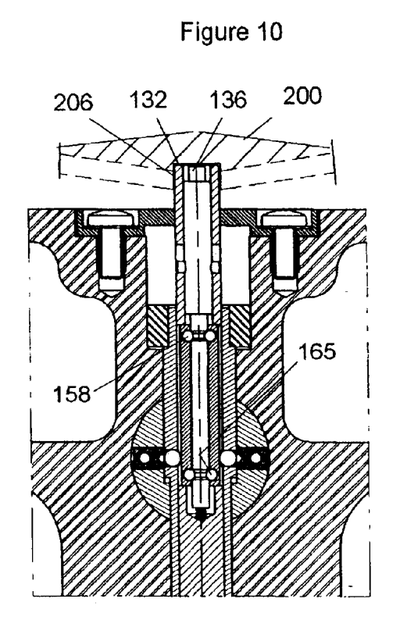
Figure 11:
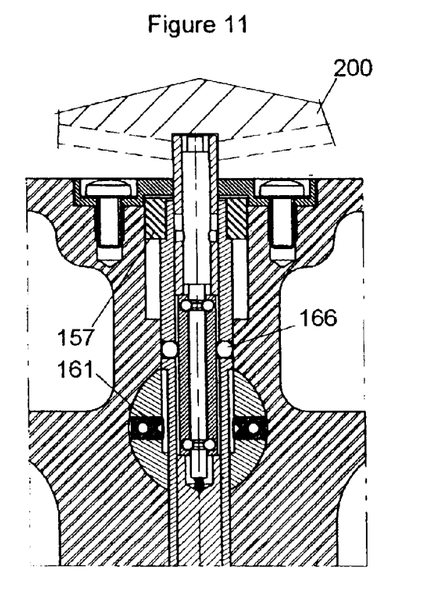

FIGS. 9 through 11 show three consecutive states of the upper portion of the roller-fitted carriage of the preferred mode of the invention. In FIG. 9, the stub 136 and the inner bush 132 have risen. The pair of half-shells 159 is free because the balls 152 are movable inside the constricted segment 150. The balls 158 and 165 are apart. The balls 166 lock the external bush 131 onto the roller-fitted carriage. The class divider is translationally situated between two consecutive mooring adapters and the connector support is precluded from rising.

In FIG. 10 the stub 136 is lowered by the contour of the channel bottom 202 of the mooring adapter 200 and as a result the pin 151 in the segment 153 of the stub 136 reaches the end of its lower excursion in the aperture 152 whereas the two pairs of high and low balls 158 and 165 resp. are situated in the constricted segments 156 and 163 of the stub 136 and release the external bush 131.

As shown in FIG. 11, the inner bush 131 driving the connector support 157 may rise as soon as the stub 136 is released in the appropriate seat of the mooring adapter 200 (FIGS. 6–8). The pair of balls 166 exits the yokes 161.

The class divider of the invention was described above in relation to a passenger cabin having a central aisle and two lines of lateral luggage racks underneath each of which runs a guide rail. The divider comprises two roller-fitted carriages on each side arm.

Figure 12:
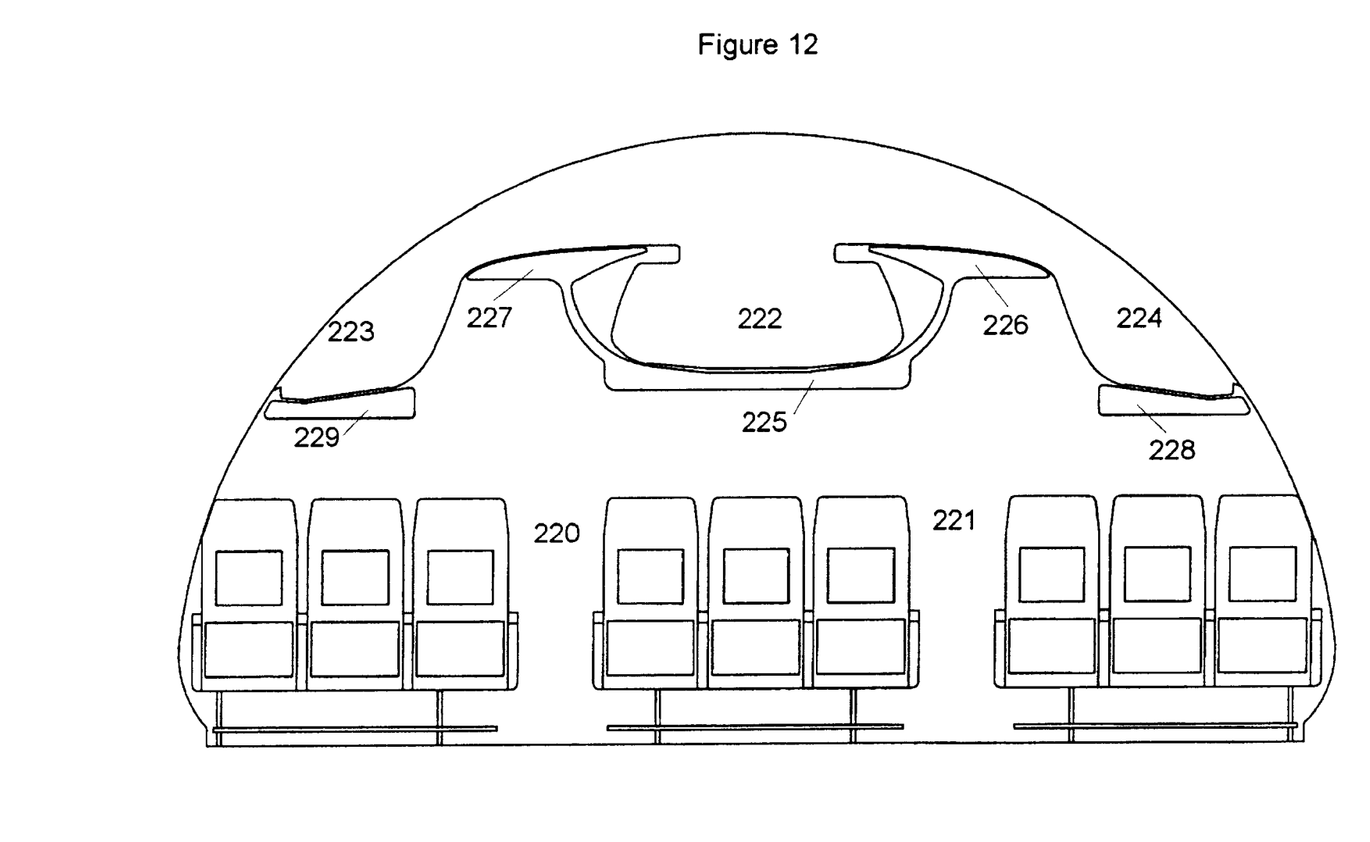
FIG. 12 shows another diagrammatic embodiment of a divider of the invention.

FIG. 12 schematically shows another cabin configuration having two aisles, namely an aisle 220 and an aisle 221, separating three seat columns. A luggage rack 222, 223 and 224 is mounted above each line of seats. A class divider of the invention, here shown installed but without its curtains, comprises a central segment 225 at the right and left ends of which are suited roller-fitted carriages of the above described design and engaging rails mounted underneath the luggage rack 222. Furthermore the divider comprises right and left side segments 226 and 227 resp. above the left and right aisles 221 and 220 which are integral with the center segment 225. Finally the class divider comprises right and left lateral separators 228 and 229 resp. which are moved by disassembly and reassembly on specific local supports.

What is claimed is:

1. A movable class divider in a vehicle passenger cabin comprising
    a lock for locking the divider into a mooring adapter selected during said divider's translation along a guide rail running longitudinally in said cabin and for unlocking it before such translation takes place,
    a connector for connecting at least one first signaling connector which is firmly affixed to a movable support associated with the translationally movable divider to a second signaling connector that is firmly affixed to said mooring adapter,
    a driver for driving said lock and connector during the translational operations,
    a stop for preventing activation of said drive as long as at least said first signaling connector is outside a given connecting position relative to said second connector.

2. The divider as claimed in claim 1 further comprising at least one roller-fitted carriage having at least one roller or wheel for engaging a rail which is firmly affixed to the cabin and which is configured along a repositioning path of the divider.

3. The divider as claimed in claim 1 wherein the at least one roller-fitted carriage is mounted for translational movement perpendicular to the rail with a slide which is firmly affixed to an element of a framework of the divider.

4. The divider as claimed in claim 1 further including an additional at least one roller-fitted carriage mounted in a stationary manner on an element of a framework of the divider.

5. The divider of claim 1 wherein the lock comprises at least one inner bush biased toward the mooring adapter by a return spring and arranged to be driven by an operating handle.

6. The divider of claim 1 wherein the connector comprises an external bush having an upper end affixed to a connector support displaceable within an aperture of an inner bush, said external bush being arranged to be driven by an operating handle between at least one disconnected position and an appropriate connected position.

7. The divider of claim 6, wherein the drive comprises a cam firmly affixed to a shaft which is connected to be moved by said handle, an end of the external bush opposite an end of the bush bearing the connector support being associated with a first cam follower, an end of the inner bush opposite an end of the bush arranged for contacting a mooring adapter selected along a repositioning path being associated with a second cam follower.

8. The divider as claimed in claim 1 wherein the stop comprises a position detector associated with said mooring adapter selected along a repositioning path.

9. The divider of claim 8, wherein said detector comprises a stub projecting from an end of an inner bush, the stub being arranged to contact the mooring adapter selected along the repositioning path and to cooperate with a predetermined double-slope contour of a channel in a side opposite said mooring adapter, whereby the stub is arranged to be flush only when an end thereof opposite the inner bush is situated in a locking seat of said mooring adapter.

10. The divider as claimed in claim 9, further including a spring for outwardly biasing the inner bush, the spring being located between a bottom portion of said inner bush and an end of the inner bush opposite the stub, a pin for limiting movement of the spring within an external bush, the pin being displaceable in a t least one aperture of said external bush.

11. The divider as claimed in claim 10, wherein the inner bush comprises a borehole containing a pair of half-shells arranged for assuming first and second positions;

the first position being such that the external bush and the support are firmly affixed to each other when the stub is not depressed due to detection of an appropriate connecting position, so that at the first position, at least one of the shaft and the cam is prevented from operating, the second position being such that the external bush is disengaged from the support when the stub is depressed due to detection of another appropriate connecting position so that at the second position, at least one of the shaft and the cam is allowed to operate.

12. The divider as claimed in claim 11 wherein the stub is integral with a narrow zone having two constrictions each arranged for receiving a pair of a high ball and a low ball seated in an inside surface of the half shells so that, when the stub is depressed flush with the end of the inner bush during detection of the appropriate position, the two pairs of balls are located in the constrictions of the narrow zone of the stub, the external bush including two seats for a pair of balls which are flush between an outer wall of the half shells when the external bush and the support are mutually firmly affixed, while being forced inward when the external bush and the support are disengaged.

13. The divider as claimed in claim 12 further including two yokes situated opposite the pair of balls which are bore by the external bush, said yokes being arranged such that the balls are forced inwardly to rest against the two half-shells when the external bush and the support are mutually disengaged, and the balls are retracted within the yokes when the external bush and the support are firmly affixed to each other.

14. The divider as claimed in claim 13 wherein the yokes are affixed by pins to covers in turn affixed to the body of the roller-fitted carriage to access to the devices precluding driving said operating devices.

15. The divider of claim 1 further comprising at least one rail extending longitudinally along a path of the moveable divider, a plurality of mooring adapters associated with said rail, each adapter being associated with said second connector and arranged for enabling said second connector to be connected with at least one of said first divider signalling and locking connector, a central segment arranged to move along a ceiling of an aisle and bearing at least one roller-fitted carriage engaging said rail, a pair of side arms one on each side of the central segment and integral with it.

16. The divider of claim 1 further comprising, at least one rail extending longitudinally along a path of the movable divider, a plurality of mooring adapters associated with said rail, each adapter being associated with said second connector and arranged for enabling said second connector to be connected with a least one of said first divider signalling and locking connector, a central segment arranged to move along a ceiling which is above at least a row of seats and bearing at least one roller-fitted carriage engaging said rail, a pair of side arms, one on each side of the central segment and integral with it and arranged to move along a ceiling of an aisle bordering said row of seats, and at least one side arm affixed to the ceiling and situated above at least one row of seats and bordering one of said aisles.

17. The divider of claim 1 further comprising, at least one rail extending longitudinally along a path of the movable divider, a plurality of mooring adapters associated with said rail, each adapter being associated with said second connector and arranged for enabling said second connector to be connected with a least one of said first divider signalling and locking connector, a central segment arranged to move along a ceiling which is above at least a row of seats and bearing at least one roller-fitted carriage engaging said rail, at least one side arm affixed to the ceiling and situated above at least one row of seats and bordering an aisle along the row of seats.

* * * * *